May 5, 1925.
W. W. NUGENT
COMBINED FILTER AND WATER SEPARATOR
Original Filed June 23, 1916   2 Sheets—Sheet 1
1,536,911
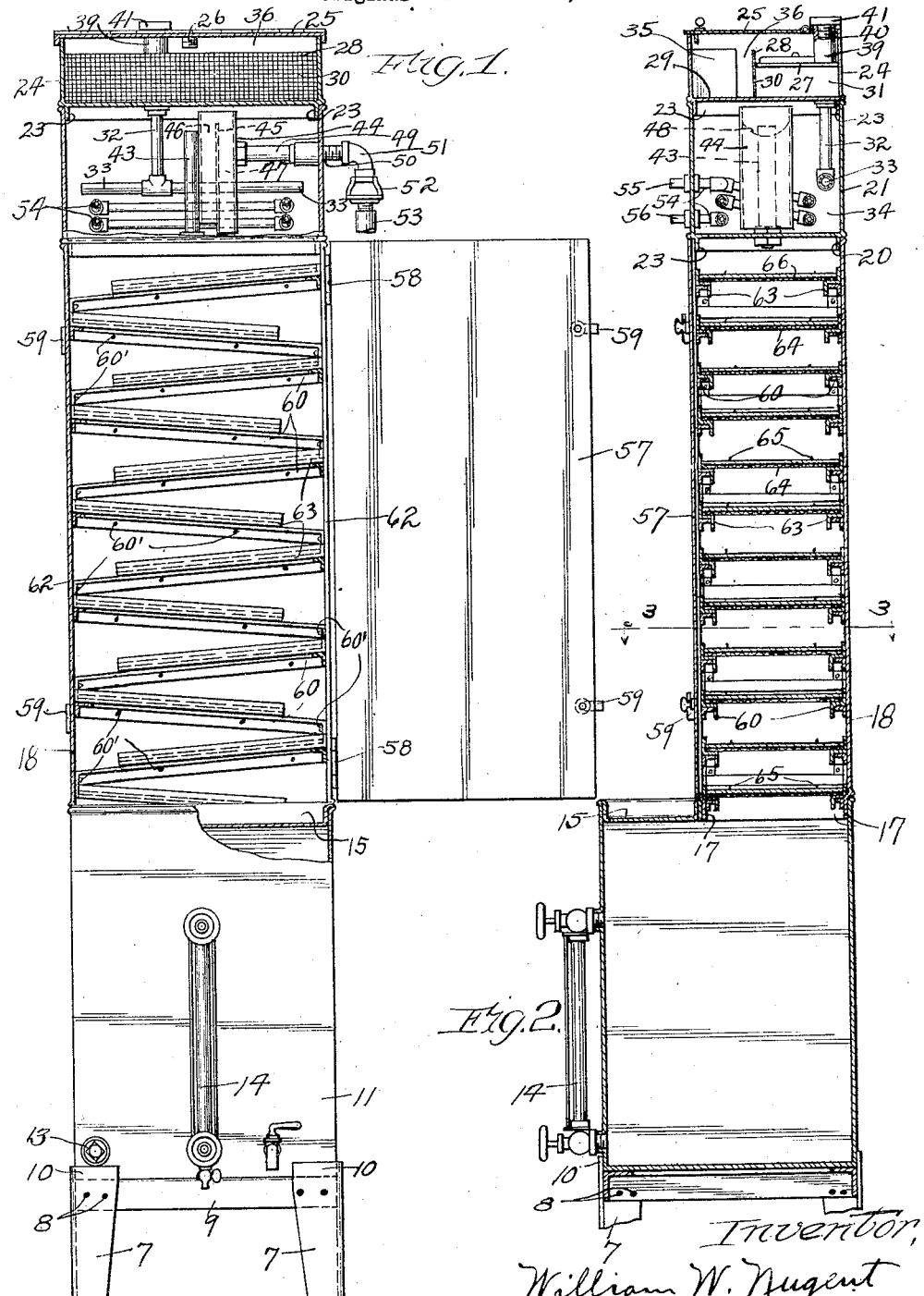

May 5, 1925.
W. W. NUGENT
COMBINED FILTER AND WATER SEPARATOR
Original Filed June 23, 1916  2 Sheets-Sheet 2
1,536,911
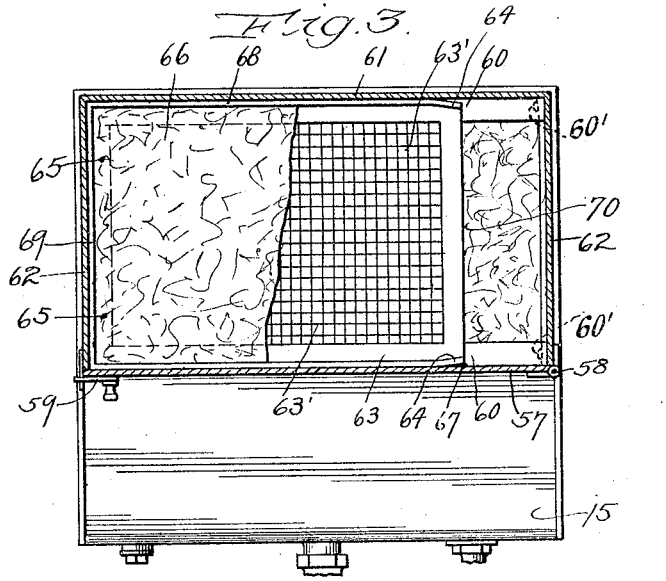
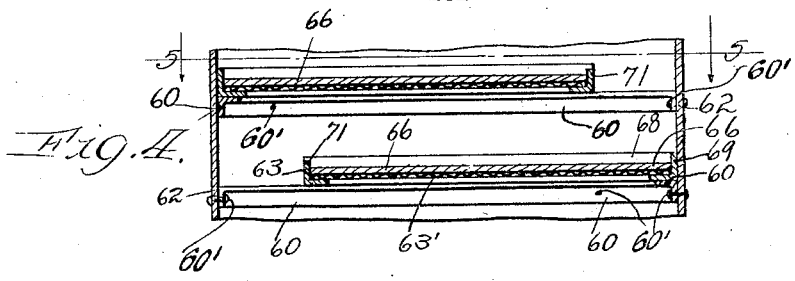
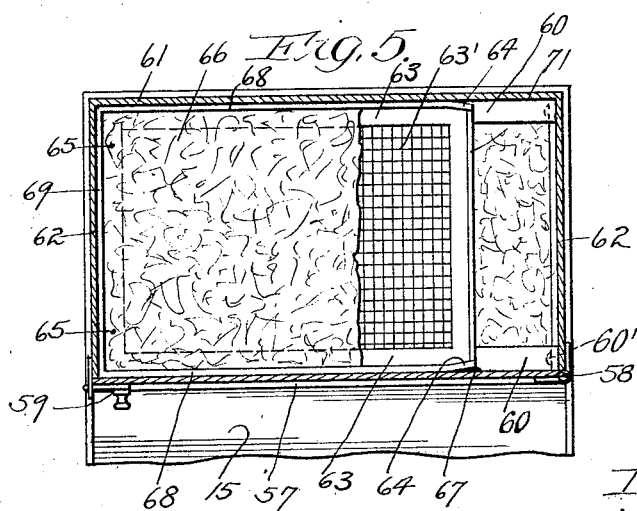
Witness:
R. L. Torrington
Inventor,
William W. Nugent
By Charles M. Nissen
Atty.

Patented May 5, 1925.

1,536,911

UNITED STATES PATENT OFFICE.

WILLIAM W. NUGENT, OF CHICAGO, ILLINOIS.

COMBINED FILTER AND WATER SEPARATOR.

Original application filed June 23, 1916, Serial No. 105,350. Divided and this application filed July 2, 1920. Serial No. 393,576.

*To all whom it may concern:*

Be it known that I, WILLIAM W. NUGENT, a citizen of the United States, residing at Chicago, in the county of Cook and State of Illinois, have invented certain new and useful Improvements in Combined Filters and Water Separators, of which the following is a specification.

This application is a divisional application of Serial No. 105,350, filed June 23, 1916, for combined filter and water separator, issued July 5, 1921 as United States Letters Patent No. 1,383,479.

My invention relates to apparatus for removing impurities from lubricating oil and also for separating water from lubricating oil, and the principal object of the present invention is to provide an improved device of this nature which is made up of detachable sections to facilitate transportation and the assembly thereof at the place of use, such improved device being simple in construction, easily accessible as to various parts, and effective, efficient and automatic in operation.

Other objects of the invention will appear hereinafter, the novel features and combinations of elements being set forth in the appended claims.

Referring to the accompanying drawings—

Fig. 1 is a front view of a filter mechanism embodying my invention with portions broken away to expose underlying parts and with a door of the construction open;

Fig. 2 is a central vertical section of the same;

Fig. 3 is an enlarged section taken on line 3—3 of Fig. 2;

Fig. 4 is a fragmental section showing some of the parts arranged differently from the arrangement shown in Fig. 1; and Fig. 5 is a view similar to Fig. 3, but showing the arrangement of the parts in Fig. 4.

Referring to Figs. 1 and 2, it will be seen that the base of the combined water separator and filter comprises upright legs 7 of sheet metal which are riveted at 8 to a baseplate 9.

The sheet metal legs 7 are provided with upper extensions 10 to form angular recesses into which fit the lower corners of the large reservoir 11. This reservoir is therefore firmly, though detachably supported on the base member, being prevented from movement laterally therefrom by the upward extensions 10.

The front wall of the reservoir 11 may also be provided with a gage glass 14 connected up, as shown in Fig. 1, or, in any other well-known manner.

In the upper portion of the reservoir 11 I prefer to provide a rectangular opening back from the upper forward edge so as to leave a recessed shelf 15 which forms an oil-collecting pan. In the rectangular opening in the upper side of the reservoir 11 is fitted a depending rectangular flange 17 of the filter casing 18. Into the upper open end of the filter casing 18 is fitted a depending flange 20 of the water separator casing 21. In a similar manner into the upper rectangular opening of the water separator casing 21, is fitted a depending flange 23 of the filling casing 24.

It will thus be observed that the combined water separator and filter is composed of five principal parts which are detachable from each other and can therefore very easily be transported. However, the construction is such that the said principal parts may easily be assembled and when stacked one on top of the other they are held together with sufficient firmness for all practical purposes. If desired, the said five principal parts or any two of them may be permanently connected together by soldering or otherwise. I prefer, however, to make the parts detachable to facilitate transportation, assembly and replacement of the accidentally injured parts.

As shown in Fig. 1, the filling casing 24 is closed on its upper side and provided with a hinged cover plate 25 to facilitate cleaning. The lubricating oil which is to be cleaned and from which the water is to be separated may be introduced through an opening 26 in the upper side of the filling casing 24. This opening 26 may be screw-threaded on its interior to receive the screw-threaded end of the pipe extending from a circulating lubricating system, not shown. The lubricant introduced through the filling opening 26 flows over the upper surface of the plate 27 and then through the reticulated or perforated metal projection or dam 28 which extends between the lateral walls of the filling casing 24. The lubricant then passes to the bottom 29 and through the partition 30 of reticulated or perforated metal to screen the larger foreign substances in the lubricant. From the enclosed compartment 31 the lubricating oil, together with the water and fine particles of impurities, passes down the vertical pipe 32 into the horizontal pipe 33 which is open at its ends, thus introducing the lubricant into the water separator chamber 34 near its lateral walls.

In the filling casing 24 I provide a partition 35 across one of the front corners so that when the lubricant in the filling chamber 36 exceeds in depth the height of the partition 35 the lubricant will overflow into said corner and then be conducted away in any desirable manner.

In order to facilitate the cleaning of the enclosed compartment 31 I provide a pipe 39 extending from an opening in the upper wall of the compartment 31 to an opening 40 in the upper surface of the filling casing. The opening 40 is preferably screw-threaded and provided with a screw-threaded plug 41. When the plug 41 is removed a bent wire may be introduced through the pipe 39 into the compartment 31 to scrape the sediment from the corners in the compartment 31.

I prefer to place the opening 40 and the vertical pipe 39 in vertical alinement with the vertical pipe 32 so that when the plug 41 is removed and a straight wire inserted through the pipe 39 it may be used to clean out sediment collected in the pipe 32, and by using a wire of sufficient flexibility the wire may be extended through the branch pipes 33 so as to maintain free flow of the lubricant from the filling chamber into the water separating chamber.

Before introducing any lubricant into the filling chamber it is preferable to partially fill the water separating chamber 34 with water, approximately two-thirds full. Then when the lubricant is introduced into the chamber 34 the oil will rise to the top and the water separate therefrom, but not until the combined depth of the water and the oil is sufficient will any oil flow into the filtering apparatus. In the center of the water separating chamber 34, as shown in Fig. 1, is located a vertical pipe 43 which is open at its upper end and communicates with the filter casing 18 at its lower end. Therefore, when the depth of the combined water and oil exceeds the length of the vertical pipe 43 the flowing oil will flow down the pipe 43 into the upper end of the filter casing 18.

Alongside the vertical pipe 43 is located a sheet metal receiver 44 with an intermediate partition 45 specially constructed for a particular purpose. This partition divides the receiver 44 into two compartments 46 and 47. The compartment 46 is open at both its lower and upper ends, while the compartment 47 is closed at its lower end and open only at its upper end, thus forming a cup rectangular in cross-section. No oil can enter either of the compartments 46 or 47 because the receiver 44, as shown in Figs. 1 and 2, extends a sufficient distance above the vertical pipe 43 to prevent any oil from flowing over the upper edges of the receiver 44. The water, however, enters the lower open end of the compartment 46 and extends upwardly therein tending to reach a depth to overflow the partition 45 into the cup 47. If the partition 45 had a horizontal straight edge at its upper end there would be considerable tendency for capillary attraction in the corners to elevate the water higher than desired and thus tend to empty the contents of the separating chamber 34 not only of the water therein, but also of the oil ultimately. This tendency may be augmented particularly when the connections are such that a syphoning action might continue the flow started by the capillary attraction at the corners of the compartment 46 adjacent the partition 45. I, therefore, prefer to provide a curved or arcuate edge 48 for the upper end of the partition 45, as shown in Fig. 2. This will prevent any overflow of a liquid by reason of capillary attraction at the corners. The lowermost edge of the curve 48 is arranged below the upper end of the pipe 43 only a small distance; preferably, in practice, about a quarter of an inch, so as to economize in the total quantity of lubricant, and also to hasten the water separating operation thereof. By having a film of oil on top of the water of no greater thickness than is necessary to prevent the water from flowing through the vertical pipe 43 it will be seen that the oil will be very quickly introduced into the filtering casing 18 after it has been introduced into the filling casing.

The receiver 44 is preferably supported near the center of the water separating chamber by means of the pipe 49 which is rigidly secured at 50 to one of the walls of the water separating chamber. The pipe 49 communicates with the upper portion of the cup 47 and is connected to the elbow joint 51 which directs the water through the sight feed 52 into the waste-pipe 53. It will thus be evident that when water passes into the lower end of the compartment 46 and over the partition 45 it fills the cup 47 until it overflows through the pipe 49 into the waste-pipe 53. This operation goes on automatically as more and more lubricant is introduced into the filling casing.

To facilitate the separation of the water from the oil and to facilitate the flow of the oil, heating pipes 54 may be arranged in the water separating chamber, as shown in Figs. 1 and 2. The heating devices are preferably supported from the front wall of the water separating chamber 21 without interfering with the supply pipe 33, or with the water chambers 46, 47, or the intake oil pipe 43. The heating medium, such as steam, may be introduced at 55, and after circulating through the pipes 54 withdrawn at 56.

It should be particularly observed that the intake oil pipe 43 and the water chambers 46 and 47 are preferably located approximately in the center of the water separating chamber 34 so that when the entire combined water separator and filter is not on a level the operation of separating the water will not be seriously interfered with. Tilting movements within certain limits of the entire apparatus away from a horizontal position of the separating chamber will not alter the relation between the upper central edge of the partition 45 and the upper end of the pipe 43 to prevent proper separation of the water while still maintaining efficiency. For the sake of efficiency it is preferable to reduce the thickness of the film of oil on top of the water in the separating chamber and this is accomplished not only by having the curved edge 48, but also by centering the pipe 43, together with the receiver 44. Or, the farther the receiver 44 and the pipe 43 are separated and the less they are centralized in the water separating chamber 21 the greater the necessity for exact leveling of the entire apparatus if efficiency is to be maintained.

Filter casing 18 is provided with a series of filter sections over which the oil, after the water has been separated therefrom, may flow successively. These sections are disposed one above the other so that oil leaving one section will drop by gravity onto the next section. In Fig. 1 I have indicated these sections as being inclined, and in Fig. 4 I have indicated them as being horizontal. From this it will be apparent that they may be arranged in various manners, but should be so arranged that the oil drops from one section to the next below. I preferably arrange them in somewhat staggered relation, that is, every other section engages one end wall of casing 18, and the other alternate sections engage the other, as clearly indicated in Figs. 1 and 4.

In order that the sections may be readily accessible I provide a door 57, hinged as at 58, as shown in Fig. 1. The door is provided with latches 59 for holding it closed. With the door covering the entire front of casing 18 any one of the filter sections can be removed without disturbing any of the others.

The sections are substantially alike in form and construction. Each section rests on a ledge 60, which is indicated as being generally U-shaped, and of substantially rigid material. Each ledge has one side secured to the rear wall 61 its central portion secured to one side wall 62 and its ends secured to the other side wall 62 of the casing 18 by means of rivets, or, in any other desirable manner, so that the open end of the frame is at one side wall 62. The trays are shorter than the width of the casing 18 providing a space between one of the side walls 62 at the open end of the U-shaped ledge and the adjacent edge of such tray to permit the free flow of lubricant to the next tray below. Each section or tray comprises a substantially rectangular frame 63 made up of any suitable material, preferably metal, and tapered at one end slightly, such as indicated at 64 in Figs. 3 and 5. In the frame 63 is a reticulate metal or screen 63' forming the bottom of the tray. Formed on the frame 63 are a plurality of points or hooks 65 which serve as means for holding a filter cloth 66 in position in the tray. On the ledges 60 I provide abutments 67 at the tapered portions of said frames to hold the latter back against the side wall 62 and maintain them in the positions indicated in the drawings. The frames which are arranged inclined preferably have front and rear vertical walls 68 and end walls 69 at the upper ends thereof. The other ends 70 are left open so that the oil running down from the top of the cloth can run over onto the next tray below.

I have indicated the trays which are arranged horizontally, (see Figs. 4 and 5,) as formed like the other trays already mentioned, except at the open end of the first-mentioned trays I provide upstanding walls 71 which are somewhat shorter than the walls 68 and 69. With this construction the oil can accumulate on top of the cloth until it reaches the height of wall 71 when it will run over onto the next tray below. Of course, as long as the cloths 66 are clean the oil will run through them, but should they become clogged then the oil will accumulate, as above mentioned, and run over wall 71. It will be apparent, however, that the open-ended trays can be used when arranged horizontally, and that the trays having the short walls 71 can be used inclined, when so desired.

Since the tray is provided with vertical flanges 68 at the back and front portion and with a vertical connecting flange 69 at the upper end, the tray directs flowing oil over the filtering cloth out of the lower open end of the tray. Therefore, the cleaning of the oil does not depend in any way on sedimentation, nor does it depend altogether on filtering through the filtering cloth because it has been found in practice that when the oil is permitted to gradually flow over the filtering material many of the impurities adhere to the filtering material and are taken out of the oil which are not taken out by filtering through the filtering cloth. In order to have rapid cleaning of the oil the porosity of the filtering material should not be such as to make the process too slow. I have, therefore, found that by combining the through filtering action with the flowing action I clean the oil of the larger particles by the through filtering action while maintaining the entire cleaning operation at a rapid rate and therefore maintaining the efficiency of the entire apparatus which is particularly important where considerable oil is being used in a circulating lubricating system and the large tank 11 is the source of supply and the oil is constantly drawn from the opening 13 into the lubricating circulating system.

While the trays for supporting the filtering cloths 66 may be secured in fixed position in the filtering casing 18 I prefer to make them removable not only for the renewal of the filtering cloth but also to prevent interference with the continuation of the cleaning and filtering operation when one tray is thus removed. If one tray is removed at a time for renewal of its filtering cloth the cleaning and filtering operation need not be interfered with, particularly when the filtering sections are sufficient in number. The filtering cloths may be used repeatedly after cleaning them in each instance, preferably by soaking them in kerosene, and subsequently boiling them in a mixture of soap and water.

However, if desired, new filtering cloths may be used for all renewals, but in any event the cloths should be preferably so cut as to fill the entire width and length of each tray and fit close to the upper end of each tray so that substantially all of the oil entering the upper end of the filtering casing 18 will pass through and over the filtering cloths in succession or serially.

The parts of this application showing and describing means for separating water and oil, and the parts showing and describing means for separating foreign materials from the water and oil before said water and oil are separated, are not claimed in this application but described and claimed in my United States Letters Patent No. 1,383,479, dated July 5, 1921, for combined filter and water separator.

Obviously those skilled in the art may make various changes in the details and arrangement of parts without departing from the spirit and scope of my invention as defined by the claims hereto appended, and I wish therefore not to be restricted to the precise construction herein disclosed.

I claim:

1. In filtering apparatus, the combination with an upright receptacle having an opening on one vertical side thereof, of a plurality of superposed spaced-apart filtering elements each having overflow means, and means for supporting said filtering elements in said receptacle to cause the oil to filter by gravity serially through said elements and to overflow from one element to the next below.

2. In filtering apparatus, the combination with a receptacle having an opening in one vertical side thereof, of a plurality of filtering elements each provided with filtering material and an overflow means, and mechanism for supporting said filtering elements in said receptacle for accessibility through said opening and in superposed spaced-apart relation to cause filtering serially by gravity and overflow from one filtering element to that next below.

3. A combined water separating and cleaning device comprising filling, separating, filtering and storing chambers, a door for the entire front of the casing of the filtering chamber to permit inspection of said filtering chamber, and a collecting pan shelf at the bottom and in front of the door.

4. In filtering apparatus, the combination with a receptacle, of a plurality of U-shaped supporting frames rigidly secured to the back and sides of said casing in spaced-apart and staggered relation, a plurality of open-ended trays one mounted on each of said supports and each having a reticulated metal dam, a plurality of filtering cloths one mounted in each of said trays, and means for preventing said filtering cloths from sliding along said trays.

5. In filtering apparatus, the combination with a casing, of a plurality of superposed frames secured to said casing, removable trays having screen dams and open ends mounted on said frames, filtering material in said trays, and door mechanism for closing the entire width of said casing.

6. In filtering apparatus, the combination with a storage receptacle having an opening in the upper end thereof, of a filter casing mounted over said opening, a recessed shelf in front of said casing in the upper end of said storage receptacle, door mechanism for the entire width of said receptacle above said recessed shelf, and a plurality of filtering elements supported in said filter casing for independent and separate movement thereof during the operation of the remainder.

7. A combined water separating and cleaning device for lubricating oils comprising filling, separating, filtering and storing chambers, the storage chamber being provided with an external collecting pan shelf in front of the lower end of the filtering chamber, and a door for the entire front of the casing for the filtering chamber, said door when in closed condition being in upright position and when open leaving the entire upright space at the front of the filter casing free and unobstructed, said door also swinging above said collecting pan shelf when open.

8. In filtering apparatus, the combination with a receptacle, of a plurality of gravity filtering elements, means for supporting said filtering elements in superposed spaced-apart and staggered relation so that oil filtered through one tray will drop to the next below and so that any oil overflowing from one will pass to the next below, and a door for an opening in said receptacle in front of the outer edges of the tray, said opening rendering accessible all of said filtering elements.

9. In filtering apparatus, the combination with gravity and overflow filtering elements, of a receptacle, means for supporting said filtering elements in superposed spaced-apart and staggered relation, said receptacle having an opening in one vertical side thereof to render accessible said filtering elements, and a door closing said opening.

10. Filtering apparatus comprising a series of trays arranged one above the other and having filter material at their lower portions with upstanding walls around said filter material, one of said walls of each tray having an external portion lower than the other walls providing a path for oil not passing through the filter material to the tray next below.

11. In filtering apparatus, the combination with a receptacle having an opening in one vertical side thereof, of a plurality of gravity and overflow filtering elements, and means for supporting said filtering elements in superposed spaced-apart staggered relation within said receptacle with each filtering element removable laterally through said opening independently of the other filtering elements.

In testimony whereof I have signed my name to this specification on this 30th day of June, A. D. 1920.

WILLIAM W. NUGENT.